United States Patent [19]

Hubert et al.

[11] 3,710,077

[45] Jan. 9, 1973

[54] HEATER-TIMING APPARATUS

[75] Inventors: Helmut Hubert, Erda; Anton L. Jung, Herborn; Manfred Lapczyna, Wetzlar; Erhard Ledwon, Guntersdorf; Wilfried Rock, Herborn; Gerhard Schmidt-Burbach, Wetzlar, all of Germany

[73] Assignee: Buderus' Sche Eisenwerke, Wetzlar, Germany

[22] Filed: May 10, 1971

[21] Appl. No.: 141,718

[30] Foreign Application Priority Data

May 12, 1970 Germany......................P 20 22 963.4

[52] U.S. Cl. ..................219/492, 219/493, 219/498
[51] Int. Cl. ..............................................H05b 1/02
[58] Field of Search ........99/326, 331; 219/492, 493, 219/498

[56] References Cited

UNITED STATES PATENTS

| 3,315,891 | 4/1967 | Allen | 219/492 |
| 2,817,401 | 12/1957 | Ostrander | 219/493 |
| 3,575,584 | 4/1971 | Goodhouse | 219/492 |

Primary Examiner—Bernard A. Gilheany
Assistant Examiner—F. E. Bell
Attorney—Karl F. Ross

[57] ABSTRACT

An oven in an aircraft has a heater operable at a relatively high and a relatively low heating level. A timer which serves to turn off the heater can also operate at a rate corresponding to real time and at a slower rate. When the oven is operated at its low level the timer is operated at its slower rate. In this manner the timer will turn off the oven after a predetermined amount of heating, even if the oven energy consumption is reduced for a part of the cooling or thawing period. The timer has a synchronous motor driven by an oscillator whose output frequency is a function of the operating level of the heater.

8 Claims, 4 Drawing Figures

Helmut Hubert
Anton L. Jung
Manfred Lapczyna
Erhard Ledwon
Wilfried Rock
G. Schmidt-Burbach
Inventors.

By     J Ross

Attorney

HEATER-TIMING APPARATUS

FIELD OF THE INVENTION

The present invention relates to a heating apparatus. More particularly this invention concerns an oven and timer usable in an aircraft or the like wherein the power input to the oven heater is reduced at times.

DESCRIPTION OF THE PRIOR ART

The electrical systems in aircraft are usually built to supply just enough power to run all of the essential systems during takeoff and landing when such heavy equipment as the landing gear is used or the engines are turned on. The oven used to thaw out and/or cook the meals for the passengers are usually electric and are arranged so that their power consumption can be reduced during takeoff and landing when electrical power is in short supply.

Timers are provided on such ovens since the meals are adapted to be heated at a predetermined temperature for a predetermined length of time. The time is set and, when the period is up, it turns the oven off and usually signals that the food is ready. However, if the electrical power input to the oven is reduced for a portion of the period the cooking or thawing time must be correspondingly lengthened. Careful calculation of the lost heating time is extremely complicated, since the account must be taken both of just how long the power was reduced and to what degree. Since this calculation must be done at the normally busy start-of-flight and end-of-flight times when the airplane staff is heavily occupied in any case, it is rarely done accurately and poor results are common. Signals, which alert the oven operator to a cutback of power or a resumption of normal power, often are not noticed immediately so that efforts to manually reset the timer predicated upon the assumption that the response is immediate, have also proven to be unsatisfactory.

OBJECTS OF THE INVENTION

It is an object of the present invention to provide an improved heating apparatus of the general class described.

Another object is the provision of an improved oven usable on an aircraft and having a timer which does not require manual resetting for periods of power cutback or for periods of full-power resumption following such cutbacks.

Yet another object is to provide such a timed oven which overcomes the above-given disadvantage and compoensates for reductions in heating level.

SUMMARY OF THE INVENTION

The above objects are attained according to the present invention by an oven having a heater operable at at least two levels and a timer also operable at two rates. Means is provided to reduce the rate of operation of the timer to correspond to that of the heater, thereby effectively lengthening the heating time to make up for the lost cooking or heating.

According to features of this invention the timer has a synchronous motor run by an oscillator or pulse generator incorporating a tuned circuit at least one of whose members can be varied. Thus when an operational amplifier with positive- and negative!-feedback loops is used, a reactive component is provided in the negative-feedback loop to cause the circuit to oscillate, and any of the various other feedback or grounding registers or the capacitor can be bypassed or otherwise have their electrical properties varied to change the frequency of oscillation. When the oven is put on reduced power the oscillation frequency, which is the motor's supply frequency, is automatically reduced so that the timer slows down.

In such an apparatus the food is introduced and the timer is set. If the oven is run at reduced power for an interval the heating time is automatically increased so that the plane personnel need not worry about it or have to calculate supplementary heating time.

The apparatus according to the invention thus comprises, in addition to a load operable with variable power and a timer for controlling the duration of operation of the load, means responsive to an alteration of the level of power at the load for compensatorily altering the speed of the timer. Where, as is preferable, the timer has a synchronous motor, the last-mentioned means is a variable-frequency square-wave oscillator provided with frequency-selector means coupled with the load for setting the actual output frequency of the oscillator in accordance with the level of load operation.

In its method aspects, the invention comprises the step of operating the timer at a speed dependent upon the level of operation of the load, preferably by generating a pulse train of a frequency related to the level of load operation and then driving the timer at a speed determined by this frequency.

DESCRIPTION OF THE DRAWING

The above and other objects, features, and advantages will become apparent from the following description, reference being made to the accompanying drawing in which.

SPECIFIC DESCRIPTION

Figure 1:
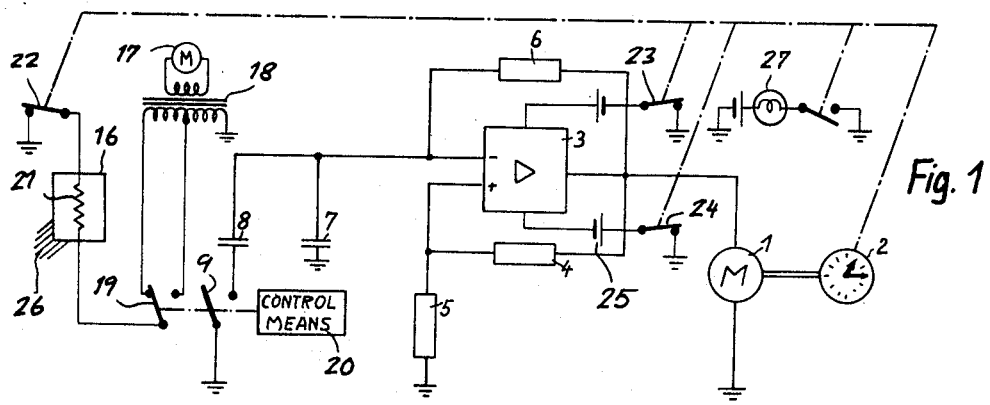
FIG. 1 is a schematic diagram of a first embodiment of the present invention.

As shown in FIG. 1 an oven 16 mounted in an airplane shown at 26 has an electric heating element 21 which, according to the position of a SPDT switch 19 can be connected across the secondary of a transformer 18 connected across an AC power source 17.

When the switch is in the left-hand position as shown in FIG. 1 the heater 21 is connected across the full secondary of the transformer 18 and is operated at full power; in the right-hand position it is connected to a tap on this secondary so that it runs at less then full power. At full power the element 21 consumes 10 kilowatts and at partial power 8 kilowatts alternating-current electrical energy. Instead of this transformer arrangement a triac could be used to limit the power, as described in *Transistor, Thyristor, and Diode Manual* (RCA Technical Series SC–14).

The oven 16 can be shut off by a timer consisting of a synchronous motor 1 as disclosed in chapter 7 of *Servomechanism Practice* by Ahrendt and Savant (McGraw-Hill: 1960) coupled to an elapsed-time indicator 2 itself coupled with a switch 22 that can turn off the heater 21.

An oscillator or pulse generator built around an operational amplifier 3 generates a supply frequency to run the motor 1 at a predetermined rate. A pair of batteries 21 and 25 have respective switches 23 and 24 connected to the timer 2 and serve as power supply to the oscillator. When the timer 2 shuts down the oven 16 it also shuts down the oscillator, and can even sound a bell or light a lamp 27 to indicate that the cooking or thawing is completed.

The negative terminal of the amplifier 3 is connected via a negative-feedback resistor 6 to the amplifier output and a similar positive-feedback resistor 4 connects the positive amplifier terminal to the amplifier output. Should both these resistors 4 and 6 be of the same resistance and no other connections made to the positive and negative amplifier terminals the circuit would be balanced. However, the negative terminal is also connected to ground through a capacitor 7 and can also be connected when a switch 9 is closed to ground through a parallel capacitor 8. Similarly the positive terminal is grounded through a resistor 5.

Oscillation is created in the circuit by the time constant of the RC network of capacitor 7 and resistors, 4, 5, and 6 since the positive feedback through the loop of resistors 4 and 5 is not balanced to that through the loop of capacitor 7 and resistor 6. Only at the frequency determined by these elements is the circuit stable.

Control means 20, i.e. a switch operable by the aircraft pilot to reduce power consumption, is connected to both switches 9 and 19. Under normal conditions both remain in the left-hand (as seen in FIG. 1) position with the heater 21 operating at a high heating level and the motor 1 being actuated by a relatively high supply frequency. When, however, these two switches are moved to the right-hand position the power consumption of the heater 21 is reduced and the supply frequency is lowered by connection of the capacitor 8 in parallel to the capacitor 7, thereby increasing the time constant of the negative-feedback loop 6, 7, 8. The decrease in frequency should be of the same order as the decrease in heating at the oven 16, so that with a 50 Herz normal supply frequency and a 10 kilowatt normal heating energy, when the heating energy is reduced to 8 kilowatts the timer frequency is reduced to 40 Herz, for example. In this manner the timer 2 will regulate the oven for the actual amount of heating rather than just for elapsed time. Should the frozen meals, for example, be heated to 150° Fahrenheit for 1 hour the operator need merely set the timer for 1 hour. If during that time the heat is reduced to 120° Fahrenheit for 15 minutes, thereby with a temperature drop of 20 percent, the timer would actually run for 63 minutes (0.20 × 15 = 3). No tricky calculations need be made by the operating personnel.

Figure 2:
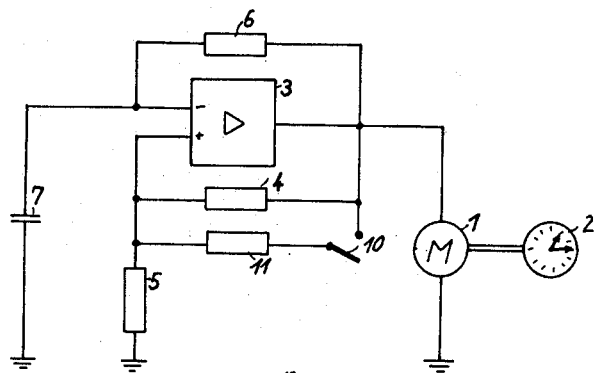
FIG. 2 – 4 are diagrams of oscillators of further embodiments of this invention.
Figure 3:
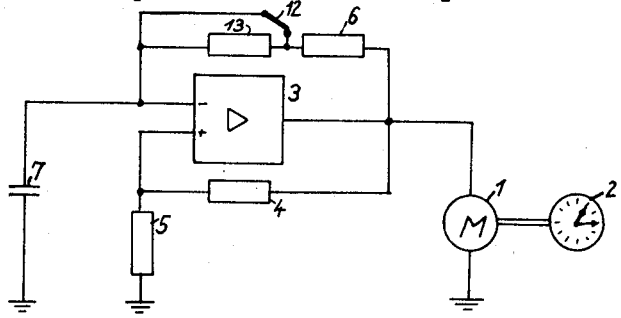
Figure 4:
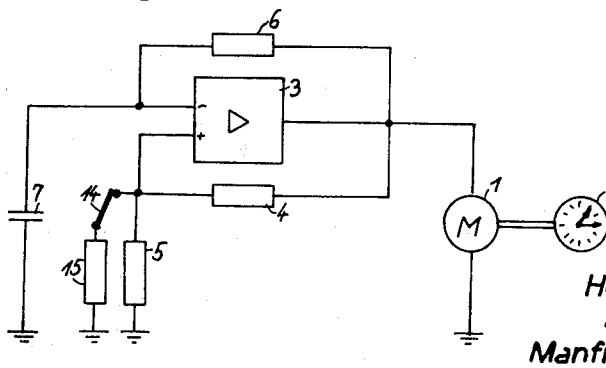

In FIGS. 2 – 4 reference numerals of FIG. 1 are used to denote identical structure. FIG. 2 shows a second resistor 11 connectable in parallel to the positive-feedback resistor 4 by means of a switch 10 that functions much as the switch 9. Closing of the switch 10 on reduction of the power input to the oven 16 decreases the positive-feedback resistance and thereby lowers the oscillating frequency.

FIG. 3 uses a resistor 13 connectable in series with the negative feedback resistor 6 by means of a normally closed switch 12 taking the place of switch 9. This switch 12 is opened to increase the negative-feedback resistance and thereby lower the oscillating frequency.

In FIG. 4 the effective negative-terminal-to-ground resistance of the circuit can be increased by disconnecting a resistor 15 which normally is connected in parallel to the resistor 5. A normally closed switch 14 serves to break this connection.

In every embodiment the timer is slowed to the same degree as the heat is decreased in the oven. This causes the oven to be shut off automatically after just the right amount of heating, regardless if the power to the oven was reduced on one or more occasions.

We claim:

1. A heating apparatus comprising:
   a heater operable at a relatively high heating level and a relatively low heating level;
   first means for switching said heater between said levels;
   a timer with a synchronous drive motor regulating said heater and operable at a rate corresponding to real elapsed time and at a slower rate; and
   second means connected between said first means and said timer for running same at the real-time rate during operation of said heater at said high heating level and at said slower rate during operation of said heater at said low level, said second means including an oscillator generating a supply frequency for said motor means for lowering said supply frequency on operation of said heater at said low level.

2. The apparatus defined in claim 1 wherein said oscillator includes a tuned circuit having at least two elements, said means for lowering said supply frequency being operatively linked to at least one of said elements for charging the time constant of said tuned circuit.

3. The apparatus defined in claim 2 wherein said tuned circuit includes a resistive positive-feedback loop and a resistor-capacitor negative-feedback loop.

4. The apparatus defined in claim 3 wherein said means for lowering said supply frequency including means for increasing the reactance of said negative-feedback loop.

5. The apparatus defined in claim 3 wherein said means for lowering said supply frequency includes means for changing the resistance of said positive-feedback loop.

6. The apparatus defined in claim 3 wherein said means for lowering said supply frequency includes means for reducing the resistance of said negative-feedback loop.

7. The apparatus defined in claim 2 wherein said heater is electrically powered.

8. The apparatus defined in claim 7 wherein said timer includes switch means for turning off said heater.

* * * * *